F. DESSAUER.
NUT LOCK.
APPLICATION FILED MAR. 23, 1918.
1,300,131. Patented Apr. 8, 1919.
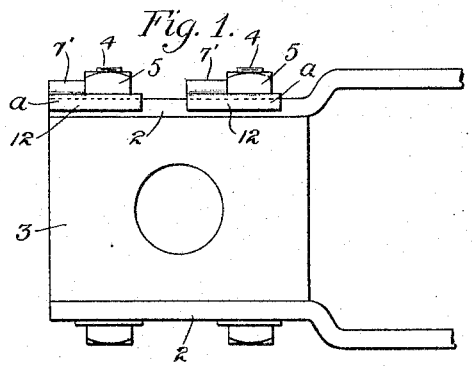
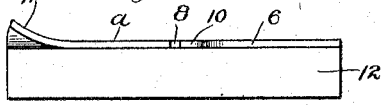
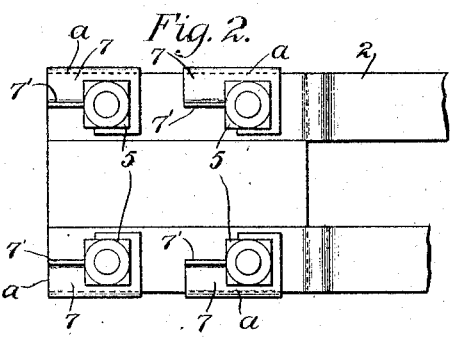
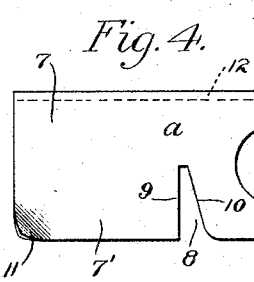
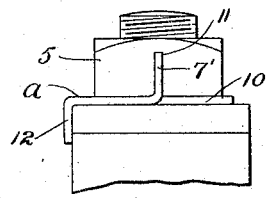
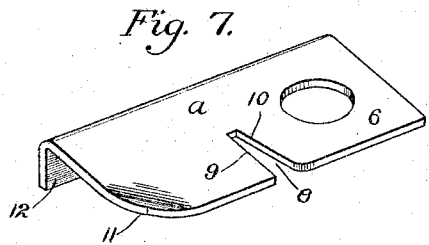
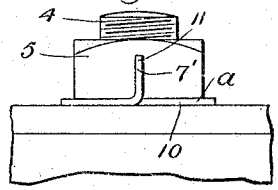
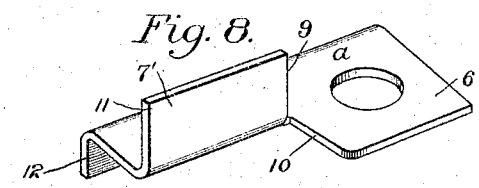
WITNESSES
F. Windridge
Lois Weneman
INVENTOR
Frederick Dessauer
by C. M. Clarke
Attorney

UNITED STATES PATENT OFFICE.

FREDERICK DESSAUER, OF PITTSBURGH, PENNSYLVANIA.

NUT-LOCK.

1,300,131. Specification of Letters Patent. Patented Apr. 8, 1919.

Application filed March 23, 1918. Serial No. 224,341.

*To all whom it may concern:*

Be it known that I, FREDERICK DESSAUER, a citizen of the United States, residing at Pittsburgh, in the county of Allegheny and State of Pennsylvania, have invented certain new and useful Improvements in Nut-Locks, of which the following is a specification.

My invention consists of an improvement in nut locks, of the class of washer locks, and has for its object to provide a cheap, simple and efficient means for holding the nut of a bolt, and especially in connection with mechanism adapted for useful coöperation with the nut lock itself.

Generally stated, the device comprises an integral piece of sheet or plate metal, preferably made of a low carbon steel capable of being easily bent, having a perforated bolt hole, a bearing portion for the nut having the function of a washer, a laterally extended portion adapted to lie flatly against the face of the object with which the bolt and nut are incorporated, and a partially separated lateral tongue or rib portion partially bent up at one corner and adapted to be bent throughout its entire length at substantially right angles to the extended plate portion for engagement with the side face of the nut.

In one form of the construction the plate is preferably provided with a downwardly extending lip or flange adapted to engage the corner or edge portion of the bolted structure, and the device is made and adapted to operate in the manner as will be more fully hereinafter set forth.

Referring to the drawings which illustrate preferred embodiments of the invention, Figure 1 is a view in side elevation of a portion of a car truck showing the application of my improved nut lock;

Fig. 2 is a plan view of Fig. 1;

Fig. 3 is an enlarged edge view of the lock as made, ready for application;

Fig. 4 is a plan view of the construction of Fig. 3;

Fig. 5 is an end view in elevation showing the lock as applied provided with the holding flange and in locking position;

Fig. 6 is a similar view showing the plate without such flange;

Fig. 7 is a perspective view of one form of lock detached ready for application;

Fig. 8 is a similar view showing the bracing and holding rib turned up into locking position.

Referring to Figs. 1 and 2, I have illustrated the nut lock as applied to any utilizing construction, as for instance, the truck of a railroad car, the upper and lower members 2, 2, of which are bolted together and to the journal box 3 by bolts 4 and nuts 5.

The nut locking washer is generally indicated by the letter *a*.

Referring to the detail illustrations thereof, and to the form applicable to the use illustrated in Figs. 1 and 2, and as shown in Figs. 3, 4, 5, 7 and 8, the main body portion of the lock *a* consists of a longitudinal bearing plate disposed generally on a common plane and having a washer portion 6 and an extended bearing portion 7 partially separated from portion 6 by a transverse cut 8. Said cut extends substantially half way across the face of the main plate 6—7 to about its center, and said cut is preferably made whereby to provide, on the inner portion of the partly severed section 7' of portion 7 a bearing edge 9. The opposite edge 10 of the cut or partition is preferably somewhat inclined as shown providing for ease of cutting the metal and corresponds substantially to one of the edges of the nut when applied, if a square nut. If a hexagon nut is used, or in either case, ample bearing surface in the nature of a washer is provided for the under side of the nut.

The opposite corner 11 of portion 7' is turned up, as indicated in Figs. 3, 4 and 7, in the normal construction of the lock prior to being set for holding the nut. The purpose of thus bending up the corner portion of the extended member 7 is to provide for the insertion of a suitable tool as a cold chisel, swage, etc., so that the partly severed portion 7' may be bent upwardly after the nut is screwed tight to a holding position, as indicated in Figs. 1, 2, 5 and 8, in which views such part is indicated by the numeral 7'.

Said portion being co-extensive with the length of the extended plate portion 7, and of a length equal to or greater than that of the washer portion 6, provides a stiff, rigid bracing member for the plate extension, so that when in position, and the partially severed rib or tongue portion is bent upwardly into holding engagement with the nut, as shown, it will at the same time very strongly brace the extension 7, and positively prevent it from being sprung or plied upwardly, which is a common trouble in washer nut locks of a similar type.

Edge 9 being at right angles to the longitudinal center of the washer plate as a whole bears accurately against the face of nut 5 and is of sufficient width so that when bent up it practically engages the full depth of the nut.

These features are of very considerable advantage in providing against accidental displacement or loosening of the nut lock in service.

In the operation of the figures referred to, the washer plate is provided with an edge retaining lip or flange 12 substantially throughout its entire length and of sufficient depth to properly embrace the side edge of member 2, as in Fig. 1, or of any similar object to which the nut lock is applied. Such edge flange additionally braces and strengthens the device as an entirety, maintaining its rigid structure and at the same time also assisting in holding the lock in position.

In the construction shown in Fig. 6, the parts are substantially the same as above described and are similarly indicated by reference numerals, except that the flange 12 is omitted, adapting the device to application to a continuously flat surface, as in the case of a rail joint or other similar application.

What I claim is:

1. A nut lock consisting of an elongated washer plate having a longitudinal rearwardly extending flange along one side and a bolt hole at one end, and a partly severed side portion at the other end provided with an outermost turned up corner and an inner locking edge adapted to be turned up at right angles to the washer plate.

2. A nut locking and bracing washer plate having at one end a washer portion provided with a bolt hole and an extended portion partly severed therefrom having an inner nut-engaging edge and an outer partly turned up corner adapted to be set up at right angles to the plane of the plate throughout said extended portion to provide a bracing and locking rib, and a holding flange extending throughout the length of the device in an opposite direction from one edge of the plate.

In testimony whereof I hereunto affix my signature.

FREDERICK DESSAUER.

Copies of this patent may be obtained for five cents each, by addressing the "Commissioner of Patents, Washington, D. C."